United States Patent Office 3,459,763
Patented Aug. 5, 1969

3,459,763
CERTAIN AMINO IMIDAZOLE DERIVATIVES
Norbert Gruenfeld, Bronx, N.Y., assignor to Geigy Chemical Corporation, Greenburgh, N.Y., a corporation of Delaware
No Drawing. Filed Jan. 25, 1966, Ser. No. 522,829
Int. Cl. C07d 49/36; C07c 157/14; A61k 27/00
U.S. Cl. 260—309
17 Claims

ABSTRACT OF THE DISCLOSURE

The compounds are of the class of 2-amino imidazole derivatives which are useful as cardiovascular, analgesic, and anti-inflammatory agents and which inhibit gastric secretion. Illustrative embodiments are 1-(4-methoxyphenyl)-5-methyl-2-aminoimidazole and 2-(o-chlorophenylamino)imidazole.

---

This invention relates to novel nitrogen-containing organic compounds, to intermediates therefor, and to processes for the preparation of such compounds. The compounds of the present invention possess valuable pharmacological properties and are useful as pharmaceutical agents.

The compounds of the present invention are amino imidazole derivatives characterized by the following structural Formula I:

I

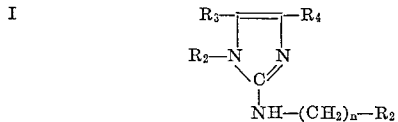

wherein:

$R_1$ represents monocarbocyclic aryl when $n$ is 0 and $R_2$ is hydrogen, lower alkyl, lower alkanoyl, monocarbocyclic aroyl, or aryl (lower) alkyl; and represents hydrogen, lower carbalkoxyalkyl, or lower carboxyalkyl when $n$ is an integer of from 0 to 2 and $R_2$ is monocarbocyclic aryl;

$R_2$ represents monocarbocyclic aryl when $n$ is an integer of from 0 to 2 and $R_1$ stands for hydrogen, lower carbalkoxyalkyl, or lower carboxyalkyl; and represents hydrogen, lower alkyl, lower alkanoyl, monocarbocyclic aroyl or aryl-(lower) alkyl when $n$ is 0 and $R_1$ stands for monocarbocyclic aryl;

$R_3$ and $R_4$ represent hydrogen or lower alkyl; and $n$ is an integer of from 0 to 2.

More particularly, the present invention relates to amino imidazole derivatives of the following formulae II and III:

II

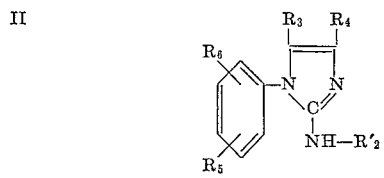

wherein:

$R'_2$ represents hydrogen, lower alkyl, lower alkanoyl, monocarbocyclic aroyl, or aryl-(lower) alkyl;

$R_3$ and $R_4$ represent hydrogen or lower alkyl; and $R_5$ and $R_6$ represent hydrogen, halogen, lower alkoxy or trifluoromethyl;

III

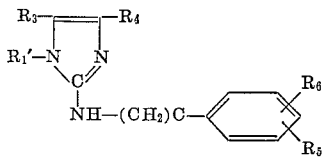

wherein:

$R'_1$ represents hydrogen, carbalkoxyalkyl, or carboxyalkyl;

$R_3$ and $R_4$ represent hydrogen or lower alkyl;

$R_5$ and $R_6$ represent hydrogen, halogen, alkoxy, or trifluoromethyl; and $n$ is an integer of from 0 to 2.

By the terms "lower alkyl" and "lower alkanoyl" when used per se or in combination with other terms in the specification and appended claims, is intended a branched or straight hydrocarbon chain with 1 to 6 C atoms. Illustrative of such alkyl groups are methyl, ethyl, propyl, isopropyl, butyl, sec. butyl, t-butyl, pentyl, isopentyl, hexyl and the like. Representatives of such alkanoyl groups is acetyl, propionyl, butyryl, isovaleryl and the like.

By the term "lower alkoxy" is meant such groups as for example methoxy, ethoxy, propoxy, isopropoxy, butoxy, isobutoxy, and the like.

The term "halogen" is used for fluoro, chloro, bromo, and iodo groups.

The term "monocrabocyclic aryl" stands for phenyl and phenyl substituted by one or more halogen atoms, lower alkoxy or trifluoromethyl groups or combinations thereof.

The term "monocarbocyclic aroyl" stands for benzoyl and benzoyl substituted by one or more halogen atoms, lower alkoxy or trifluoromethyl groups or combinations thereof.

With the term "aryl (lower) alkyl" is meant lower alkyl substituted by benzyl and benzyl substituted by one or more halogen atoms, lower alkoxy groups, or the trifluoromethyl group.

The term "carbalkoxyalkyl" indicates lower alkyl substituted by a lower carbalkoxy group. Illustrative of such carbalkoxyalkyl groups are carbethoxy methyl, carbomethoxy methyl, carbethoxy ethyl, carbomethoxy propyl, carbethoxy propyl, carbopropoxy methyl, carbopropoxy ethyl, carbopropoxy propyl, carbomethoxy butyl, carbethoxy butyl, carbopropoxy butyl etc.

The term "carboxy alkyl" is used to illustrate lower alkyl substituted by the carboxy group. The carboxy alkyl group is exemplified by carboxy methyl, carboxy ethyl, carboxy propyl, carboxy butyl, carboxy pentyl, carboxy hexyl and the like.

The compounds of the present invention have valuable pharmacological activities. They show, for instance, cardiovascular, analgesic and anti-inflammatory activities, as well as inhibition of gastric secretion.

These compounds may be administered parenterally or orally in any of the usual pharmaceutical forms including tablets, capsules, powders, suspensions, solutions, syrups and the like. Particularly valuable formulations include sustained release preparations which may be compounded by any of the known procedures.

The therapeutically valuable compounds of the present invention include all physiologically acceptable salts of the imidazole derivatives characterized by Formua I. Such physiologically acceptable, non-toxic addition salts include those derived from organic and inorganic acids, such as, without limitation, hydrochloric, hydrobromic, sulfuric, phosphoric, methanesulfonic acetic, lactic, succinic, malic, maleic, aconitic, phthalic, tartaric and the like acids.

The new imidazole compounds can be obtained by cyclization of correspondingly substituted guanidinium derivatives. More specifically, the compounds of the above indicated formula can be prepared by reacting a suitably substituted thiourea with alkyl or aralkylhalide such as methyliodide, thereby forming the corresponding isothioronium iodide derivative. By reacting an amino acetal or an amino ketal with the obtained isothiourea derivative, the correspondingly substituted guanidinium derivative is obtained which can easily be converted to the related imidazole derivative by cyclization by means of an acid.

The preparation of the amino imidazole derivatives according to the present invention can be demonstrated by the following equations:

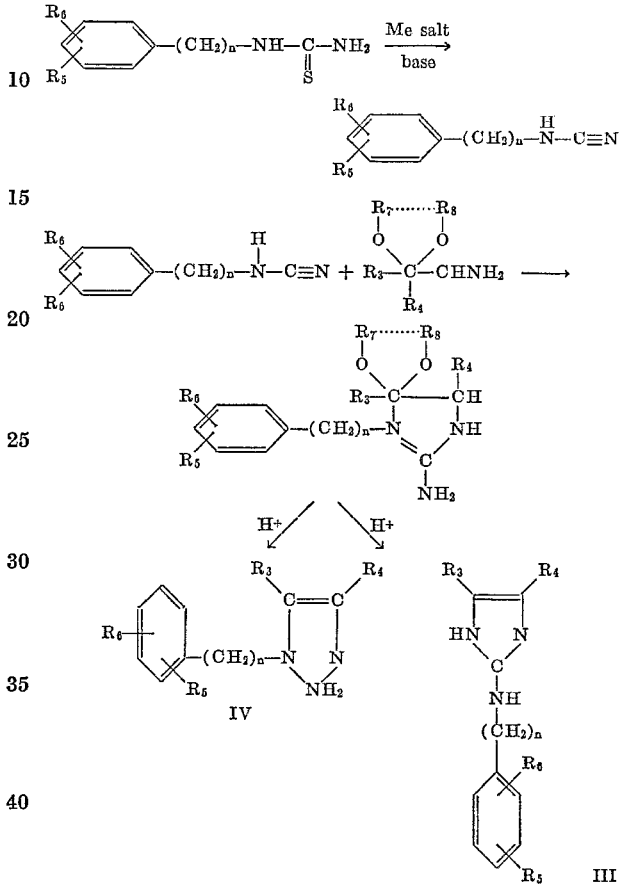

In these equations:

$R_3$, $R_4$, $R_5$, and $R_6$ represent the same substituents as mentioned in Formulae II and III;

$R_7$ and $R_8$ represent lower alkyl or lower alkylidene; and $R_{10}$ represents lower alkyl or aryl (lower) alkyl;

Hal represents halogen.

In the compounds of Formula IV, $n$ is 0, while in the compounds of Formula III, $n$ is a number of from 0 to 2.

The compounds of the present invention can also be prepared according to the following alternative method:

A substituted thiourea is treated with a base and a metal salt like, for instance, lead acetate, mercuric oxide, cupric sulfate etc. and the resulting reaction product, the correspondingly substituted cyanamide is treated with an amino acetal or amino ketal. The obtained guanidine derivative is cyclized by means of an acid to the correspondingly substituted amino-imidazole.

The reaction procedure is exemplified by the following equations:

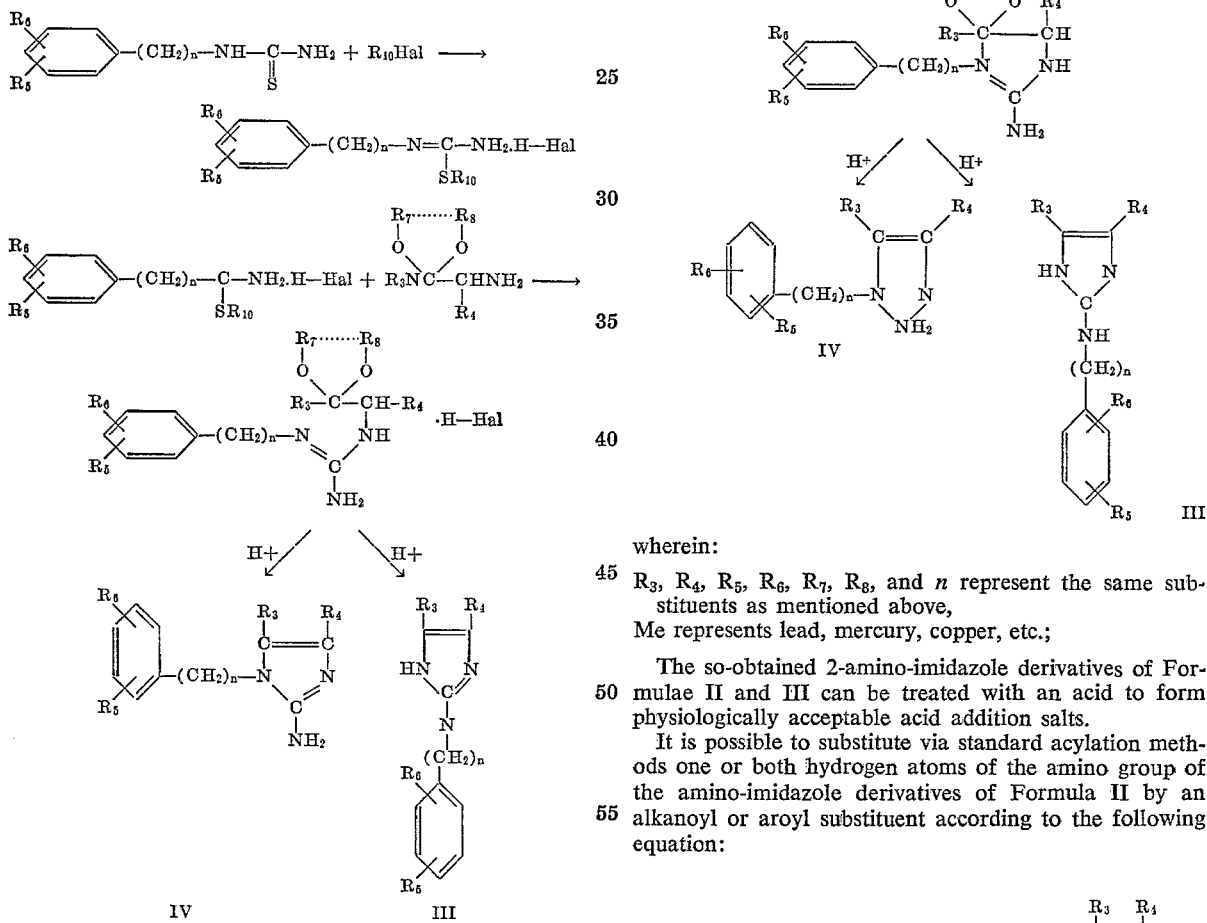

wherein:

$R_3$, $R_4$, $R_5$, $R_6$, $R_7$, $R_8$, and $n$ represent the same substituents as mentioned above, Me represents lead, mercury, copper, etc.;

The so-obtained 2-amino-imidazole derivatives of Formulae II and III can be treated with an acid to form physiologically acceptable acid addition salts.

It is possible to substitute via standard acylation methods one or both hydrogen atoms of the amino group of the amino-imidazole derivatives of Formula II by an alkanoyl or aroyl substituent according to the following equation:

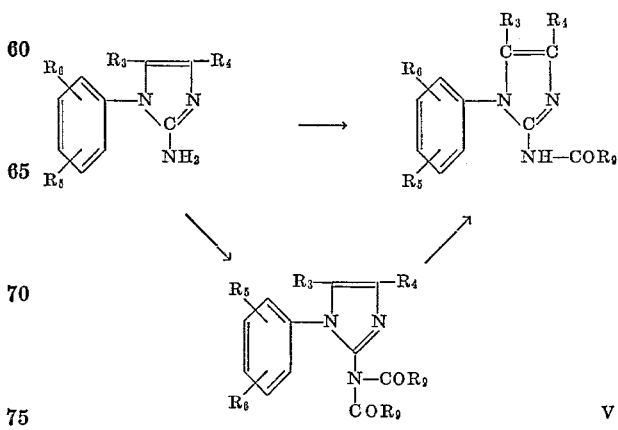

wherein:

$R_9$ represents lower alkyl or phenyl which can be substituted and $R_3$, $R_4$, $R_5$, $R_6$, represent the same substituents as mentioned above.

Compounds of Formula V can be reduced to the corresponding hydrogenated derivatives.

This reaction is demonstrated by the following equation:

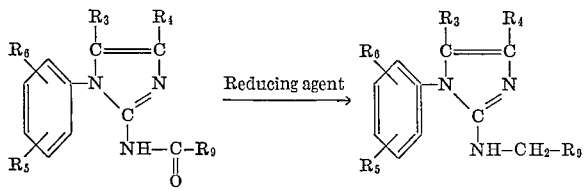

wherein:

$R_3$, $R_4$, $R_5$, $R_6$ and $R_9$ represent the same substituents as mentioned above.

The chemical reduction is carried out by means of lithium aluminum hydride, diborane, di-isobutyl-aluminum hydride etc.

As stated above, the compounds have anti-inflammatory activity. Merely for illustration, the anti-inflammatory activity of 1-(4-methoxyphenyl)-5-methyl-2-aminoimidazole hydrochloride for instance, is determined according to C. A. Winter, E. H. Risley, and G. W. Nuss: Proceedings of the Society for Experimental Biology and Medicine 1962, V. 111, 544–547.

Male rats, five per group, weighing between 155–380 grams, are given the test compound orally one hour before carrageenin is administered. 0.1 cc. of carrageenin is injected into the plantar area of the right hind paw. Three hours after carrageenin and four hours after test compounds or vehicle, the rats are sacrificed. Right and left hind paws are removed and weighed. The difference between these paws is determined for all animals within a group and the average difference calculated. The average difference of the vehicle control group is used as a point of comparison for test groups.

Phenylbutazone is administered as standard anti-inflammatory compound.

| Results: | Dose administered, mg./kg | Percent protection |
|---|---|---|
| 1-(4-methoxyphenyl)-5-methyl-2-aminoimidazole hydrochloride | 50 | 32 |
| Phenylbutazone | 100 | 37 |

To show the cardiovascular activity, cats were anesthetized with chloralose and arterial blood pressure registered by means of a Statham pressure Transducer. The results are shown in the following table:

| Compounds tested | Number of animals | Dose, mg./kg., I.V. | Control blood pressure in mm. Hg | Response test blood pressure in mm. Hg |
|---|---|---|---|---|
| 1-(4-methoxyphenyl)-2-aminoimidazole hydrochloride | 4 | 1.0 | 170=75 | 225=88 |
| 2-(p-fluorophenyl-amino)imidazole hydrochloride | 2 | 1.0 | 158=88 | 130=70 |

These compounds were administered intravenously.

Another embodiment of the present invention is the use of pharmaceutical compositions comprising a physiologically acceptable carrier or diluent and a proportion of a compound of the present invention sufficient to exhibit anti-inflammatory and/or cardiovascular activity. The proportion of a compound of the present invention incorporated into the carrier ranges from about 10 to about 90 parts by weight per 100 parts of carrier material.

To produce dosage units for peroral application, the compositions of this invention may be combined, e.g. with solid pharmaceutically acceptable pulverulent carriers such as lactose, saccharose, sorbitol, manitol; starches such as potato starch, corn starch or amylopectin, also laminaria powder or citrus pulp powder; cellulose derivatives or gelatin, also lubricants such as magnesium or calcium stearate or polyethylene glycols (Carbowaxes) of suitable molecular weights may be added, to form tablets or press coated tablets. The latter are coated for example, with concentrated sugar solutions which can contain e.g. gum arabic, talcum and/or titanium dioxide, or they are coated with a lacquer dissolved in easily volatile organic solvents or a mixture of organic solvents. Dyestuffs can be added to these coatings, for example, to distinguish between different contents of active substance.

Hard gelatin capsules contain, for example granulates of the instant compositions with solid, pulverulent carriers such as, e.g. lactose, saccharose, sorbitol, mannitol, and further starches such as potato starch, corn starch or amylopectin, cellulose derivatives or gelatin, as well as magnesium stearate or stearic acid.

Suppositories containing a compound of the present invention are readily obtained by techniques well known to those skilled in the art of compounding dosage forms. A compound of the present invention is dispersed in a carrier such as cocoa butter and the suppositories formed in the usual way.

The following examples are given by way of illustrating the instant invention. They are not to be construed as limiting the scope thereof in any way. The temperatures are given in degrees C.:

EXAMPLE 1

1-(p-methoxyphenyl)-2-aminoimidazole 1-(4-methoxyphenyl)-thiourea was prepared as described by J. Cymerman-Craig and W. M. Nealy, Austral, J. Chem. 13, 341 (1960). A solution of p-anisidine (0.8 mole; 98.7 g.), ammonium thiocyanate (1.60 mole, 122 g.) in 1.5 N HCl (535 ml.) was stirred under reflux for 9 hours. Product which crystallized during reflux period, was removed by filtration; yield: 125.02 g., M.P. 213–216°. The product was recrystallized from dimethylformamide.

4-methoxyphenyl S-methylisothiourea hydroiodide.— According to W. G. Finnegan et al., J. Org. Chem. 18, 779 (1953), methyl iodide (0.252 mole, 15.7 ml.) was added while stirring to a cooled suspension of p-methoxyphenyl thiourea (0.24 mole, 43.9 g.) in anhydrous ethanol (120 ml.). The mixture was heated under reflux for 2 hours; complete solution occurred after 1 hour. The solution was cooled and the desired product crystallized; yield: 64.9 g., M.P. 156–60°. Two recrystallizations from isopropanol (charcoal, 450 ml.) gave the desired product (48.2 g., M.P. 161-164°).

1 - (p-methoxyphenyl)-3-($\beta,\beta$ - dioxyethyl)guanidinium iodide.—p-Methoxyphenyl S-methyl isothiourea hydroiodide (0.139 mole, 45 g.) was dissolved in dry ethanol (140 ml.). The solution was cooled and aminoacetaldehyde diethyl acetal (0.139 mole, 18.5 g.) was added dropwise while stirring. The solution was heated under reflux for 3 hours and evaporated to dryness to give an oil (59.5 g., $n_D^{24°}=1.57$). The crude product was directly hydrolyzed.

1-(p-methoxyphenyl) - 2 - aminoimidazole hydrochloride.—The above crude product was dissolved in 250 ml. of concentrated hydrochloric acid and the solution was heated at 50° for 1 hour. The acid solution was cooled, diluted with water, washed several times with ether, and reduced to a small volume under vacuum. The solution was rendered basic with saturated sodium carbonate solution to pH 9 and was repeatedly extracted with chloroform. The chloroform solution was washed with a small volume of water, dried over sodium sulfate and evaporated to dryness to yield a semisolid (25.6 g.). Recrystallization from ethyl acetate gave the product (7.3 g., M.P. 153–156°); a second crop of impure product (6.2 g., M.P. 121–

129°) was also obtained. The higher melting product was dissolved in isopropanol, the solution was cooled and 4.5 ml. of 7.5 N ethanolic HCl was added. Product (5.2 g., M.P. 222–225° dec.) crystallized; second crop: 0.8 g., M.P. 221–225°; lower melting mixture (6.2 g., M.P. 121–129°) also yielded some desired hydrochloride (1.1 g., M.P. 219–223° dec.). Two recrystallizations from isopropanol (50 ml., charcoal) gave the desired compound. (5.8 g., M.P. 225–7° with decomposition).

Ultraviolet spectrum: $\lambda_{Max.}^{MeOH}$ 224 m$\mu$ ($\epsilon$, 14,500), 280 m$\mu$ ($\epsilon$, 1400)

*Analysis.*—Calculated for $C_{10}H_{12}ClN_3O$: C, 53.20; H, 5.36; N, 18.64; Cl, 15.71. Found: C, 53.13; H, 5.66; N, 18.68; Cl, 15.58.

1-(p-methoxyphenyl)-2-aminoimidazole.—1-(4 - methoxyphenyl)-2-aminoimidazole hydrochloride (0.5 g.) was dissolved in water (10 ml.). The pH was adjusted to 9 with saturated sodium carbonate solution and the product was extracted repeatedly with chloroform. The chloroform extract was washed with a little water, dried over sodium sulfate and evaporated to dryness to give the title product (0.4 g., M.P. 160–163°).

EXAMPLE 2

1-phenyl-2-aminoimidazole hydrochloride

Phenyl S-methylisothiourea hydroiodide.—This compound was prepared as previously described by W. G. Finnegan, R. A. Henry, and E. Lieber, J. Org. Chem. 18, 779 (1953). Methyl iodide (0.42 mole, 59.6 g., 26.1 ml.) was added dropwise while stirring to an ice-cooled suspension of phenylthiourea (0.40 mole, 60.8 g.) in anhydrous ethanol (200 ml.). The reaction mixture was stirred at room temperature overnight. The resutling mixture was evaporated to dryness, and the residue was recrystallized from isopropanol (200 ml.) to give the desired product (107 g., M.P. 144–8°.

1-phenyl-3-($\beta$-diethoxy ethyl) guanidinium iodide.—Aminoacetaldehyde diethylacetal (0.1mol, 13.3 g.) was added dropwise to a cooled suspension of phenyl-S-methyl isothiourea hydroiodide (0.1 mole, 29.4 g.) in anhydrous ethanol. The solution was heated under reflux for three hours, and evaporated to dryness to give an oil (41.30 g., $n_D^{24}$=1.5620). This crude product was used directly for the next step.

1-phenyl-2-aminoimidazole hydrochloride.—A solution of 1 - phenyl - 3 - ($\beta$-diethoxy ethyl)guanidinium iodide (crude, 37.8 g.) in 100 ml. of concentrated hydrochloric acid was heated at 50° for one hour. Water (300 ml.) was added, and the solution was extracted with ether. The aqueous solution was rendered basic to pH 9 with saturated sodium carbonate solution and repeatedly extracted with chloroform after saturating with sodium chloride. The chloroform solution was washed with water, dried over sodium sulfate and evaporated to dryness to give residue (12.6 g.). This was dissolved in isopropanol (reagent, 100 ml.) and ethanolic HCl (12 ml., 8 N) was added. Re-evaporation to dryness gave semisolid which was recrystallized from isopropanol (75 ml.) to give desired compound (6.33 g., M.P. 206–9°). Two recrystallizations from isopropanol (charcoal, 50 ml.) gave the desired compound (4.3 g., M.P. 213–5°).

Ultraviolet spectrum.—end absorption.

*Analysis.*—Calculated for $C_9H_{10}ClN_3$: C, 55.23; H, 5.15; N, 21.49; Cl, 18.13. Found: C, 55.52; H, 5.45; N, 21.57; Cl, 18.22.

1-phenyl-2-aminoimidazole.—The above hydrochloride (0.5 g.) was converted to the free base of extraction from alkaline solution (pH 9) with chloroform to give impure 1-phenyl-2-aminoimidazole (0.2 g., M.P. 117–21°).

EXAMPLE 3

1-(4-methoxyphenyl)-5-methyl-2-aminoimidazole hydrochloride

1 - (4-methoxyphenyl)-3-[1-(2,2-ethylenedioxypropyl)] guanidinium iodide.—Aminoacetone ethylene ketal (0.091 mole, 10.65 g.) was added dropwise to a cooled suspension of 4-methoxyphenyl S-methyl-isothiourea hydroiodide (see Example 1) 0.091 (mole, 29.6 g.) in absolute ethanol (100 ml.). The resulting solution was heated under reflux for 3 hours, filtered to remove insoluble material and evaporated to dryness to give an oil (36.3 g.).

1-(4-methoxyphenyl)-5-methyl - 2 - aminoimidazole hydrochloride.—The above oil was dissolved in isopropanol (100 ml.); concentrated hydrochloric acid (50 ml.) was added while cooling and the resulting solution was heated at 50° for 1½ hours. Isopropanol was removed under reduced pressure, water (150 ml.) was added; the aqueous solution was washed with ether, evaporated to a small volume under reduced pressure, made basic (to pH 9) with saturated sodium carbonate solution and extracted with chloroform (4×300 ml.). The chloroform solution was washed with water, dried over sodium sulfate and evaporated to dryness to give oil (25.3 g.). This was dissolved in isopropanol, treated with ethanolic hydrochloric acid (16.5 ml., 8.5 N) and the resulting solution was again evaporated to dryness. The residue was suspended in ethyl acetate (150 ml.). Semisolid is formed on storage in refrigerator for two days. Ethyl acetate was decanted, the residue was dried under reduced pressure and suspended in acetone (100 ml.). The resulting solid was collected (6.6 g., M.P. 209–11°). This was combined with the identical product from other batches (total: 9.5 g.) and reconverted to the free base (7.7 g., M.P. 146–8°). Reconversion to the hydrochloride salt (as described above) yielded the desired compound (8.0 g., M.P. 210–2°). Recrystallization from isopropanol yielded the desired compound (6.05 g., M.P. 210–2°).

Ultraviolet spectrum: $\lambda_{Max.}^{MeOH}$ 226 m$\mu$ ($\epsilon$, 17,600); shoulder at 281 m$\mu$ ($\epsilon$, 1800)

*Analysis.*—Calc'd. for $C_{11}H_{14}ClN_3O$: C, 55.12; H, 5.89; N, 17.52; Cl, 14.79. Found: C, 55.41; H, 5.86; N, 17.32; Cl, 14.73.

EXAMPLE 4

1-phenyl-2-(diacetylamino)imidazole 1-phenyl-2-aminoimidazole hydrochloride was dissolved in water, the solution was rendered basic to pH 8–9 with saturated sodium carbonate solution and extracted with chloroform. The chloroform solution was evaporated to dryness and the residue was recrystallized from ethyl acetate (ca. 70 ml.) to give 1-phenyl-2-aminoimidazole (14.5 g., M.P. 125–7°). This was heated under reflux for three hours with acetic anhydride (290 ml.). The resulting solution was evaporated to dryness under pressure to give title compound (22.7 g., M.P. 103–6°). Residual acetic anhydride was removed by dissolving product in chloroform, washing the chloroform solution with $NaHCO_3$-solution and re-evaporating to dryness to give a purer product (22.1 g., M.P. 140–7°). A sample was sublimed at 90° and 0.05 mm. Hg for analysis, M.P. 105–7°.

*Analysis.*—Calcd. for $C_{13}H_{13}N_3O_2$: C, 64.18; H, 5.39; N, 17.28. Found: C, 64.15; H, 5.44; N, 17.20.

Ultraviolet spectrum: $\lambda_{Max.}^{MeOH}$ 220 m$\mu$ ($\epsilon$, 11,500)

EXAMPLE 5

1-phenyl-2-acetamidoimidazole

A solution of 1-phenyl-2-diacetylaminoimidazole (15 g.) in methanol (150 ml.), water (150 ml.) and triethylamine (7.5 ml.) was stirred at room temperature overnight. Methanol was removed by evaporation under reduced pressure, pH was adjusted to 7 and the aqueous solution was extracted with chloroform. The chloroform extract was dried over sodium sulfate and evaporated to dryness; yield: 12.1 g.; M.P. 164–6°. Recrystallization from isopropanol (75 ml.) gave the desired compound (9.9 g., M.P. 166–9°).

Ultraviolet spectrum: $\lambda_{Max.}^{MeOH}$ 220 m$\mu$ ($\epsilon$, 8300)

Analysis.—Calcd.: C, 65.66; H, 5.51; N, 20.88. Found: 65.58; H, 5.72; N, 20.58.

EXAMPLE 6

2-(p-fluorophenylamino)imidazole hydrochloride p-Fluorophenyl S-methyl isothiourea hydroiodide.—Methyl iodide (0.126 mole, 17.9 g.) was added dropwise while stirring to an ice cooled suspension of p-fluorophenyl thiourea (0.12 mole, 20.4 g.) in dry ethanol (60 ml.). The reaction mixture was stirred at room tempearture overnight; complete solution occurred within an hour. The reaction mixture was evaporated to dryness, and suspended in anhydrous benzene; slow crystallization occurs. Yield: 36.1 g., M.P. 147–50°.

Analysis.—Calcd.: C, 30.77; H, 3.23; N, 8.98; I, 40.65. Found: C, 31.04; H, 3.39; N, 8.98; I, 40.54.

Ultraviolet spectrum: $\lambda_{Max.}^{MeOH}$ 222 m$\mu$ ($\epsilon$, 2)1,000

1-(p-fluorophenyl)-3-($\beta,\beta$-diethoxyethyl)guanidinium iodide.—Aminoacetaldehyde diethylacetal (0.1 mode, 14.63 g.) was added dropwise to an ice cooled solution of p-fluorophenyl S-methyl isothiourea hydroiodide (0.11 mole, 34.32 g.) in dry ethanol (10 ml.). The reaction mixture was heated under reflux for 3 hours, stirred at room temperature overnight and subsequently evaporated to dryness to give an oil (45.70 g., $n_D^{24}$=1.55).

2-(p-fluorophenylamino)imidazole.—A solution of 1-p-fluorophenyl-3-($\beta,\beta$-diethoxyethyl)guanidinium iodide (crude, 45 g.) in concentrated hydrochloric acid (150 ml.) was heated at 50° for 1 hour. The resulting solution was washed with ether, evaporated to a small volume under reduced pressure, rendered basic to pH 9 with saturated sodium carbonate solution and repeatedly extracted with chloroform. The chloroform-insoluble, water-insoluble material was filtered off; 3.50 g., M.P. 173–9° dec. The chloroform extract was washed with water, dried over sodium sulfate and evaporated to dryness to give an oil (14.6 g.). The oil was dissolved in a small volume of benzene; additional product (0.56 g., M.P. 171–8° dec.) crystallized. The mother liquor was evaporated to dryness (see Example 7). Sublimation of a small sample at 120°, 0.05 mm. Hg gave the compound (M.P. 174–6° with decomposition).

Analysis.—Calcd.: C, 61.00; H, 4.56; N, 23.72. Found: C, 60.94; H, 4.84; N, 23.60.

Ultraviolet spectrum: $\lambda_{Max.}^{MeOH}$ 260 m$\mu$ ($\epsilon$, 13,800)

2-(p-fluorophenylamino)imidazole hydrochloride.—2-(p-fluorophenylamino)imidazole (4.1 g.) was dissolved in isopropanol (reagent grade), the solution was treated with charcoal, ethanolic hydrochloric acid (7.5 N, 3.1 ml.) was added. The resulting solution was evaporated to dryness to give residue (5.4 g.). The residue was treated with charcoal in isopropanol solution and was twice recrystallized from isopropanol-ethyl acetate (1:4, 50 ml.) to give the desired compound (3.0 g., M.P. 175–178°).

Analysis.—Calcd. for $C_9H_9ClFN_3$: C, 50.58; H, 4.25; N, 19.67; Cl, 16.60. Found: C, 50.76; H, 4.32; N, 19.53; Cl, 16.54.

Ultraviolet spectrum: $\lambda_{Max.}^{MeOH}$ 225 m$\mu$ ($\epsilon$, 12,000)

EXAMPLE 7

1-(4-fluorophenyl)-2-aminoimidazole hydrochloride

A solution of 1-(p-fluorophenyl)-3-($\beta,\beta$-diethoxyethyl) guanidinium iodide (crude, 45 g., according to Example 6) in concentrated hydrochloric acid (150 ml.) was heated at 50° for 1 hour. The resulting solution was washed with ether, evaporated to a small volume under reduced pressure, rendered basic to pH 9 with saturated sodium carbonate solution and repeatedly extracted with chloroform. The chloroform-insoluble, water-insoluble material was filtered off; yield 3.50 g., M.P. 173–9° dec. (free base of Example 6). The chloroform extract was washed with water, dried over sodium sulfate and evaporated to dryness to give oil (14.6 g.). The oil was dissolved in a small volume of benzene; additional product (free base of Example 6, 0.56 g., M.P. 171–8° dec.) crystallized. The mother liquor was evaporated to dryness. The residue was dissolved in isopropanol (50 ml.), treated with charcoal, ethanolic hydrochloric acid (7.5 N, 13 ml.) was added and the solution was evaporated to dryness. Crystallization from isopropanol (40 ml.) gave title compound (6.5 g., M.P. 239–44°). Two recrystallizations from isopropanol (charcoal, 50 ml.) gave the desired compound (4.0 g., M.P. 248–50° with decomposition).

Ultraviolet spectrum: $\lambda_{Max.}^{MeOH}$ Sholder at 236 m$\mu$ ($\epsilon$, 4600); peak at 211 m$\mu$ Analysis—Calcd. for $C_9H_9ClFN_3$: C, 50.58; H, 4.25; N, 19.67; Cl, 16.60. Found: C, 50.69; H, 4.46; N, 19.61; Cl, 16.48.

EXAMPLE 8

1-phenyl-5-methyl-2-aminoimidazole hydrochloride

N-acetonylphthalimide was prepared by a slight modification of the method of R. E. Lancaster and C. A. Vanderwert, J. Org. Chem. 23, 1208 (1958). A mixture of potassium phthalimide (500 g.), 1-chloropropanone (345 ml.) and anhydrous benzene (750 ml.) was stirred under reflux for 5 hours and then at room temperature overnight. This suspension was filtered, the salts were well washed with benzene and the benzene solution was evaporated to dryness. Recrystallization of the crude product from isopropanol (125 ml.) gave the desired compound (295 g., M.P. 121–3°).

Phthalimidoacetone ethylene ketal.—A solution of N-acetonylphthalimide (0.84 mole, 170 g.), ethylene glycol (1.26 mole, 78 g.) and p-toluenesulfonic acid (4 g.) in anhydrous benzene (1250 ml.) was heated under reflux with continuous water separation for 8 hours. Recrystallization of the residue from ethyl acetate (ca. 75 ml.) gave desired product (190 g., M.P. 86–91°) which was satisfactory for use in the next reaction. Recrystallization of 5 g. of cyclohexane (30 ml.) yielded the pure product:

Analysis.—Calcd.: C, 63.15; H, 5.30; N, 5.67. Found: C, 63.23; H, 5.25; N, 5.64.

Aminoacetone ethylene ketal.—Method A: Phthalimidoacetone ethylene ketal (0.525 mole, 134.4 g.), hydrazine hydrate (0.785 mole, 30.1 ml.) and water (875 ml.) were heated under reflux for 2 hours. The solution was cooled, sodium hydroxide (3 N, 150 ml.) was added and the mixture was continuously extracted with methylene chloride overnight. The methylene chloride solution was dried over sodium sulfate, evaporated to dryness and the residue was distilled under reduced pressure to give desired compound (34.5 g., B.P. 56–56.5°/10 mm. Hg $n_D^{24}$=1.4426). Redistillation of a small fraction gave pure product (B.P. 57–57.5°/10 mm. Hg $n_D^{24}$=1.4423.

Analysis.—Calcd.: C, 51.26; H, 9.46; N, 11.96. Found: C, 51.41; H, 9.69; N, 12.11.

Aminoacetone ethylene ketal.—Method B: Phthalimidoacetone ethylene ketal (0.45 mole, 115.2 g.) and 25% aqueous potassium hydroxide solution were heated under reflux for 17 hours. The solution was cooled, extracted with methylene chloride (4×400 ml.). The methylene chloride solution was dried over soduim sulfate and distilled under reduced pressure. Aminoacetone ethylene ketal (43.0 g., B.P. 54–56°/8 mm. Hg, $n_D^{24}$=1.4425) was obtained.

Aminoacetone ethylene ketal.—Method C: A solution of 1-phthalimidoacetone ethylene ketal (0.05 mole, 12.8 g.) and n-butylamine (0.25 moles, 24.5 ml.) in methanol was heated under reflux overnight with stirring. Most of the solvent was removed by distillation under reduced pressure. The residue was extracted with ethyl ether (200 ml.); the solid was removed by filtration, the ether was evaporated and the product (1.8 g., B.P. 56–57°/8 mm. Hg. $n_D^{24}$=1.4421) was distilled.

1 - phenyl - 3 - [1 - (2,2 - ethylenedioxypropyl)]-guanidinium iodide.—Aminoacetone ethylene ketal (0.1 mole 11.70 g.) was added dropwise to a cooled suspension of phenyl S-methyl isothiourea hydroiodide (see Example 2, 0.1 mole, 29.40 g.) in anhydrous ethanol (100 ml.). The solution was heated under reflux for three hours and evaporated to dryness to give an oil (41.30 g., $n_D^{24}$=1.59). This was redissolved in methylene chloride. The insoluble material was removed by filtration, and the solution was re-evaporated to dryness to give an oil (36.6 g.). This was directly hydrolyzed.

1 - phenyl - 5 - methyl - 2 - aminoimidazole hydrochloride.—The above oil was dissolved in 50 ml. of conc. hydrochloric acid, and this solution was stirred at 50° for one hour. Water (30 ml.) was added; the aqueous solution was repeatedly washed with ether, and evaporated to almost dryness. Saturated sodium carbonate solution was added to pH 9. The basic solution was repeatedly extracted with chloroform (5×200 ml.). The chloroform extract was washed with water, dried over $Na_2SO_4$ and evaporated to dryness. The residue was dissolved in isopropanol (100 ml.), the solution was cooled and ethanolic hydrochloric acid (7.5 N, 12.5 ml.) as added. The solution was evaporated to 50 ml., and the product (7.95 g., M.P. 253–257°) crystallized. Recrystallization from isopropanol (charcoal, 35 ml.) gave the desired compound. (7.0 g., M.P. 260–263° with decomposition).

Analysis.—Calc'd. for $C_{10}H_{17}ClN_3$: C, 57.27; H, 5.77; N, 20.04. Found: C, 57.40; H, 5.83; N, 20.07.

Ultraviolet spectrum: Shoulders at 225 and 252 m$\mu$.

EXAMPLE 9

2-(o-chlorobenzylamino)-imidazole hydrochloride o-Chlorobenzyl thiourea.—This compound was previously prepared from o-chlorobenzyl isothiocyanate [A. F. McKay et al., J. Am. Chem. Soc. 81, 4328 (1959), M.P. 127°]. The following alternate method of preparation has been used. o-Chlorobenzylamine (100 g.) was dissolved in isopropanol (ca. 100 ml.), ethanolic hydrochloric acid (7.5 N, 50 ml.) was added and o-chlorobenzylamine hydrochloride crystallized on cooling; yield: 84.6 g., M.P. 216–9°. A mixture of o-chlorobenzylamine hydrochloride (0.26 mole, 47.7 g.), ammonium isothiocyanate (0.39 mole, 29.6 g.) and chlorobenzene (125 ml.) as heated with stirring at 150° for 3 hours. The reaction mixture was cooled, water (125 ml.) was added, the mixture was stirred at room temperature for ½ hour and filtered, yield: 42.7 g., M.P. 108–18°. This was heated under reflux ith a mixture of chloroform-water (1:1, 200 ml.), cooled and filtered. The resulting solid was recrystallized from isopropanol; yield 30.3 g., M.P. 123–6°.

o-Chlorobenzyl - S - methyl isothiourea hydroiodide.—Methyl iodide (0.15 mole, 9.33 ml.) as added dropwise to an ice-cooled mixture of o-chlorobenzylthiourea (0.13 mole, 25.27 g.) in ethanol (anhydrous 60 ml.). After the addition was complete, the solution was heated under reflux for one hour and evaporated to dryness. Yield: 45.7 g., M.P. 108–13°. This was suspended in ethyl acetate (ca. 150 ml.), stored at room temperature overnight and filtered. Yield: 45.5 g., M.P. 113–7°.

1 - (o - chlorobenzyl) - 3 - ($\beta,\beta$ - diethoxyethyl)guanidinium iodide.—Aminoacetaldehyde diethylacetal (0.3 mole, 40.2 g.) was added dropwise to an ice-cooled suspension of o-chlorobenzyl-S-methyl isothiourea hydroiodide (0.3 mole, 102.5 g.) in absolute ethanol (300 ml.). The resulting solution was heated under reflux for 3 hours and evaporated to dryness to give the crude guanidinium compound (136 g.).

2-(o-chlorobenzylamino)-imidazole.—A solution of 1-(o-chlorobenzyl)-3-($\beta,\beta$-diethoxyethyl)guanidinium iodide (136 g.) in isopropanol (200 mil.) and concentrated HCl (300 ml.) was heated at 50° for 1 hour. The resulting solution was evaporated to a small volume under reduced pressure, the aqueous solution was washed with ether, rendered basic to pH 9 with saturated $Na_2CO_3$ solution and extracted with chloroform (4X). The chloroform extract was washed with water, dried over soduim sulfate and evaporated to dryness to give oil (69.43 g.). This was dissolved in isopropanol, ethanolic HCl (51 ml., 7.5 N) was added while cooling and the resulting solution was reevaporated to dryness. An isopropanol solution was treated with charcoal and product (38 g., M.P. 183–9°) was crystallized from isopropanol-ethyl acetate (1:6, 1000 ml.). This was dissolved in water, the aqueous solution was filtered, treated with charcoal, washed with ether and rendered basic to pH 9 with saturated sodium carbonate solution. The product (ca. 20 g., M.P. 173–5°) that precipitated was first washed with water, and subsequently with chloroform.

Analysis.—Calc'd.: C, 57.82; H, 4.86; N, 20.24. Found: C, 57.71; H, 5.15; N, 20.21.

Ultraviolet spectrum: $\lambda_{Max.}^{MeOH}$ 215 m$\mu$ ($\epsilon$ 17,000)

2-(o-chlorobenzylamino) imidazole hydrochloride.—A solution of 2-(o-chlorobenzylamino)-imidazole (11.3 g.) in isopropanol was filtered, cooled treated with ethanolic hydrochloric acid (8.5 N, 7.65 ml.) was evaporated to dryness. The residue was recrystallized from isopropanol (charcoal, 75 ml) to give the desired product (10.5 g., M.P. 204–7°). One additional recrystallization from isopropanol (50 ml., charcoal) yielded the pure desired compound (8.8 g., M.P. 204–6°).

Analysis.—Calc'd. for $C_{10}H_{11}Cl_2N_3$: C, 49.20; H, 4.54; N, 17.21; Cl, 29.05. Found: C, 49.50; H, 4.27; N, 17.31; Cl, 29.01.

Ultraviolet spectrum: $\lambda_{Max.}^{MeOH}$ 217 m$\mu$ ($\epsilon$, 19,000)

EXAMPLE 10

1-(o-chlorophenyl)-2-aminoimidazole o-chlorophenyl cyanamide.—This was prepared from o-chlorophenylthiourea as described in Organic Syntheses, Coll. vol. IV, 172 (1963).

1-(o-chlorophenyl) - 3-($\beta,\beta$-diethoxyethyl)guanidine.—A solution of o-chlorophenyl cyanamide (0.075 mole, 11.4 g.) and aminoacetaldehyde diethylacetal (0.075 mole, 9.9 g.) in anhydrous benzene (150 ml.) was heated under reflux for 3 hours. The resulting solution was evaporated to dryness to give a crude product (21.7 g.) which was directly treated with acid.

1-(o-chlorophenyl)-2-aminoimidazole.—A solution of the above crude guanidine in concentrated hydrochloric acid (75 ml.) was heated at 50° for 1 hour. Water 75 ml.) was added and the aqueous solution was washed with ether. The aqueous solution was evaporated to a small volume, rendered alkaline to pH 9 with saturated sodium carbonate solution and extracted with chloroform. The chloroform extract was washed with water, dried over sodium sulfate and evaporated to dryness. The crude product (14.8 g.) was chromatographed over Florisil (140 g.). Elution with chloroform (1500 ml.) gave 7.9 g. of 2-(o-chloroanilino) imidazole (M.P. 107–17°) (see Example 11). Further elution with chloroform (1000 ml.) gave an oil, (1.85 g.). Elution with additional chloroform (1 liter) chloroform—1% methanol (1500 ml.) and chloroform—3% methanol, (500 ml.) gave the crude 1-(o-chlorophenyl)-2-aminoimidazole, (3.0 g., M.P.~150°). Recrystallization from benzene (75 ml.) gave purer product (2.1 g., M.P. 166–9°). One additional recrystallization from isopropanol (20 ml.) yielded the desired compound (1.56 g., M.P. 168–70°).

Ultraviolet spectrum: $\lambda_{Max.}^{MeOH}$ 212 m$\mu$ ($\epsilon$, 19,000)

Analysis.—Calc'd. for $C_9H_8N_3Cl$: C, 55.83; H, 4.16; N, 21.70; Cl, 18.31. Found: C, 55.51; H, 3.88; N, 21.40; Cl, 18.38.

EXAMPLE 11

2-(o-chlorophenylamino)-imidazole

A solution of crude 1-(o-chlorophenyl)-3-($\beta,\beta$-diethoxyethyl)guanidine (21.7 g., see Example 10) in concentrated hydrochloric acid (75 ml.) was heated at 50° for 1 hour. Water (75 ml.) was added and the aqueous solution was washed with ether. The aqueous solution was evaporated to a small volume, rendered alkaline to pH 9 with saturated sodium carbonate solution and extracted with chloroform. The chloroform extract was wished with water, dried over sodium sulfate and evaporated to dryness. The crude product (14.8 g.) was chromatographed over Florisil (140 g.). Elution with chloroform (1500 ml.) gave product (7.9 g., M.P. 107–17°). Recrystallization from benzene (75 ml.) gave a purer product (4.6 g., M.P. 126–9°). One additional recrystallization from benzene 50 ml.) yielded the desired compound (3.1 g., M.P. 125–7°).

*Analysis.*—Calc'd.: C. 55.83; H, 4.16; N, 21.70; Cl, 18.31. Found: C, 55.93; H, 4.20; N, 21.49; Cl, 18.41.

Ultraviolet spectrum: $\lambda_{Max.}^{MeOH}$ 263 m$\mu$ ($\epsilon$, 7800)

2-(o-chlorophenylamino)-imidazole hydrochloride

A solution of 2-(o-chlorophenylamino) imidazole (1.25 g., crude) in isopropanol (25 ml.) was first treated with charcoal and subsequently reacted with ethanolic HCl (8.5 N, 1.1 ml.) while cooling in an ice-bath. The resulting solution was evaporated to dryness, and the residue was recrystallized from isopropanol-isopropyl ether (1:1, 10 ml.) to give the desired compound (0.6 g., M.P. 175–7°). An additional recrystallization from isopropanol-ethyl acetate (1:2, 10 ml.) gave the pure product (0.32 g., M.P. 176–8° dec.).

*Analysis.*—Calc'd. for $C_9H_8N_3Cl$: C, 46.98; H, 3.94; N, 18.26; Cl, 30.82. Found: C, 47.20; H, 3.83; N, 18.14; Cl, 31.00.

Ultraviolet spectrum: $\lambda_{Max.}^{MeOH}$ 257 m$\mu$ ($\epsilon$, 10, 400)

EXAMPLE 12

1-phenyl-2-ethylaminoimidazole hydrochloride 1-phenyl-2-acetamidoimidazole (Example 5, 0.03 mole, 6.12 g.) was added portionwise to a suspension of lithium aluminum hydride (0.09 mole, 3.42 g.) in anhydrous tetrahydrofuran (120 ml.) under nitrogen atmosphere and cooling in an ice bath. The reaction mixture was heated under reflux for 3 hours and cooled in an ice bath. Excess lithium aluminum hydride was destroyed by the successive addition of water (7.5 ml.), 5 N NaOH (3 ml.) and additional water (12 ml.) under $N_2$ atmosphere. The reaction mixture was again heated under reflux for ½ hour, filtered and the salts were thoroughly washed with chloroform. The combined CHCl$_3$-tetrahydrofuran solution was evaporated to dryness. A solution of the crude product in isopropanol (reagent grade 50 ml.) was treated with ethanolic hydrochloric acid (4.25 ml., 8.5 N) and evaporated to dryness to give impure product (8.0 g., M.P. 165–70°). Two recrystallizations from isopropanol-ethyl acetate (1:4, ca. 75 ml.) gave the desired compound (3.65 g., M.P. 171–3°).

Ultraviolet spectrum: $\lambda_{Max.}^{MeOH}$ 215, 225 m$\mu$

*Analysis.*—Calc'd. for $C_{11}H_{14}ClN_3$: C, 59.06; H, 6.31; N, 18.78; Cl, 15.85. Found: C, 58.95; H, 6.54; N, 18.80; Cl, 15.74.

EXAMPLE 13

2-(2,6-dichlorophenylamino)imidazole hydrochloride 2,6-dichlorophenyl cyanamide.—A boiling solution of potassium hydroxide (85%, 99 g.) in water (240 ml.) was added to a boiling suspension of 2,6-dichlorophenyl thioureta (0.15 mole, 33.2 g.) in water (240 ml.). The resulting solution was immediately treated with a hot saturated solution of lead acetate trihydrate (62.7 g.), adding it in rapid stream with vigorous stirring. The resulting mixture is boiled for 6 minutes, cooled to 0° in salt-ice bath, and the lead sulfide is filtered off with suction and washed with 100 ml. of boiling 5% potassium hydroxide solution. The filtrate is acidified with glacial acetic acid (108 ml.) while maintaining temperature at 0–5°. The resulting solid was removed by filtration; yield 25.5 g., M.P. 250–65°. The resulting product was boiled with methylene chloride (300 ml.), the insoluble material (6.1 g., M.P. 271–80°, not desired product) was removed by filtration and the methylene chloride solution was evaporated to dryness to give impure cyanamide (20 g., M.P. 93–118°).

2 - (2,6 - dichlorophenylamino)imidazole hydrochloride.—A solution of crude 2,6-dichlorophenyl cyanamide (20 g.) and aminoacetaldehyde diethylacetal (0.083 mole, 11.0 g.) in anhydrous benzene was heated under reflux for two hours. The solution was filtered and evaporated to dryness to give crude guanidine (27.6 g.). A solution of the above in concentrated hydrochloric acid (140 ml.) was heated at 50° for 1 hour. Water (140 ml.) was added; the solution was filtered hot to remove insoluble material, was washed with ether, and evaporated to a small volume under reduced pressure. A crude product (5.54 g., M.P. 251–8°) precipitated and was removed by filtration. This was crystallized from isopropanol (charcoal, 40 ml.) to give purer desired product (3.46 g., M.P. 276–8° dec.). The mother liquor was rendered basic to pH 9 with saturated sodium carbonate solution and insoluble material was filtered off (free base of title product, 4.95 g., M.P. 224–9°) and washed with a little chloroform. This was dissolved in isopropanol, treated with ethanolic hydrochloric acid (3.0 ml., 8.5 N) and the resulting solution evaporated to dryness to give the crude title product (5.5 g., M.P. 268–7° dec.). Two recrystallizations from isopropanol (25 ml., charcoal) gave a purer product (3.3 g., M.P. 269–72° dec.). This was combined with batch (3.46 g., M.P. 276–8° dec.) and recrystallized from isopropanol (50 ml.) to give the desired compound (5.4 g., M.P. 273–4° dec.).

Ultraviolet spectrum: $\lambda_{Max.}^{MeOH}$ 220 m$\mu$ ($\epsilon$, 18,500); 256 m$\mu$ ($\epsilon$, 6,800)

*Analysis.*—Calc'd. for $C_9H_8Cl_3N_3$: C, 40.86; H, 3.04; N, 15.89; Cl, 40.21. Found: C, 41.25; H, 3.17; N, 15.79; Cl, 40.35.

2 - (2,6 - dichlorophenylamino)imidazole.—2-(2,6-dichlorophenyl)imidazole hydrochloride (2.3 g.) was dissolved in hot water, the solution was filtered, rendered basic to pH 9 with saturated sodium carbonate solution. The product (1.8 g., M.P. 225–8°) precipitated.

Ultraviolet spectrum: $\lambda_{Max.}^{MeOH}$ 215 m$\mu$ ($\epsilon$, 18,000); 263 m$\mu$ ($\epsilon$, 6500)

EXAMPLE 14

Ethyl 2-(2,6-dichlorophenylamino)imidazole-1-acetate

A solution of 2-(2,6-dichlorophenylamino)imidazole (0.0025 mole, 0.57 g.) and ethyl bromoacetate (0.005 mole, 0.83 g.) in absolute ethanol (5 ml.) was heated under reflux for 3 hours. The resulting solution was evaporated to dryness under reduced pressure. The residue was suspended in water (10 ml.) and extracted with ether (2×5 ml.). The resulting aqueous solution was rendered basic to pH 9 with saturated sodium carbonate solution and the mixture was extracted with chloroform (2×20 ml.). The chloroform solution was washed with water, dried over sodium sulfate and evaporated to dryness. The residue was boiled with benzene (30 ml.), cooled to room temperature, the insoluble material (impure starting material, 70 mg., M.P. 204–210°) was collected, and the mother liquor was evaporated to dryness. The residue was chromatographed over Florisil (5 g.) eluting first with benzene (200 ml.) and subsequently with benzene-chloroform (1:1, 500 ml.). The combined eluate was evaporated to dryness and crystallized from benzene (ca. 3 ml.) to give the product (70 mg., M.P. 125–30°). Recrystallization from benzene-cyclohexane (1:1, 2 ml.) gave the desired compound (40 mg., M.P. 135–6°).

*Analysis.*—Calc'd.: N, 13.33; Cl, 22.48. Found: N, 13.02; Cl, 22.89.

Any changes in conditions such as temperature, reaction time, pH value and quantities used obvious to those skilled in the art are considered within the scope of this invention.

What is claimed:

1. A 2-aminoimidazole of the formula:

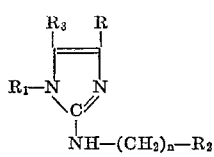

wherein:
$R_1$ represents:
(a) phenyl or phenyl substituted by one or more halogen, lower alkoxy, or trifluoromethyl when $n$ is 0 and $R_2$ is hydrogen; lower alkyl; lower alkanoyl; benzoyl; benzoyl substituted by one or more halogen, lower alkoxy, trifluoromethyl; phenyl(lower)alkyl; or phenyl(lower)alkyl substituted in the ring by one or more halogen, lower alkoxy, or trifluoromethyl;
(b) hydrogen when $n$ is an integer of from 0 to 2 and $R_2$ is phenyl or phenyl substituted by one or more halogen, lower alkoxy or trifluoromethyl;
(c) carbalkoxyalkyl of up to 8 C-atoms, or carboxyalkyl of up to 8 C-atoms when $n$ is 0 and $R_2$ is phenyl or phenyl substituted by one or more halogen, lower alkoxy or trifluoromethyl;

$R_2$ represents:
(a) phenyl or phenyl substituted by one or more halogen, lower alkoxy or trifluoromethyl when $n$ is an integer of from 0 to 2 and $R_1$ is hydrogen;
(b) hydrogen; lower alkyl; lower alkanoyl; benzoyl substituted by one or more halogen, lower alkoxy, trifluoromethyl; phenyl(lower)alkyl; or phenyl(lower)alkyl substituted in the ring by one or more halogen, lower alkoxy, or trifluoromethyl when $n$ is 0 and $R_1$ is phenyl or phenyl substituted by one or more halogen, lower alkoxy, or trifluoromethyl;
(c) phenyl or phenyl substituted by one or more halogen, lower alkoxy or trifluoromethyl when $n$ is 0 and $R_1$ is carbalkoxyalkyl of up to 8 C-atoms or carboxyalkyl of up to 8 C-atoms;

$R_3$ and $R_4$ represent hydrogen or lower alkyl; and $n$ represents an integer of from 0 to 2 or a pharmaceutically acceptable, non-toxic acid addition salt thereof.

2. A 2-aminoimidazole as defined in claim 1 of the formula

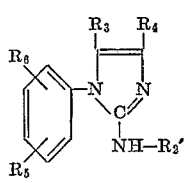

wherein:
$R_2'$ represents hydrogen, lower alkyl; lower alkanoyl; benzoyl; benzoyl substituted by one or more halogen, lower alkoxy, or trifluoromethyl; phenyl(lower)alkyl; or phenyl(lower)alkyl substituted in the ring by one or more halogen, lower alkoxy, or trifluoromethyl; and
$R_3$ and $R_4$ represent hydrogen or lower alkyl;
$R_5$ and $R_6$ represent hydrogen, halogen, lower alkoxy or trifluoromethyl or a pharmaceutically acceptable non-toxic acid addition salt thereof.

3. A 2-aminoimidazole as defined in claim 1 of the formula

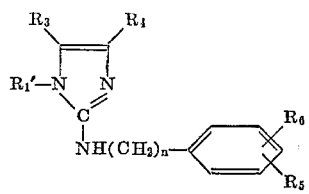

wherein:
$R_1'$ represents:
(a) hydrogen, when $n$ is 0 to 2; or
(b) carbalkoxyalkyl of up to 8 C-atoms; carboxyalkyl or up to 8 C-atoms when $n$ is 0;
$R_3$ and $R_4$ represent hydrogen or lower alkyl;
$R_5$ and $R_6$ represent hydrogen, halogen, lower alkoxy, or trifluoromethyl or a pharmaceutically acceptable, non-toxic acid addition salt thereof.

4. A 2-aminoimidazole as defined in claim 2 wherein $R_2'$, $R_3$, $R_4$, and $R_5$ are hydrogen and $R_6$ is p-methoxy, or the hydrochloric acid addition salt thereof.

5. A 2-aminoimidazole as defined in claim 2 wherein $R_2'$, $R_3$, $R_4$, $R_5$, and $R_6$ are hydrogen.

6. A 2-aminoimidazole as defined in claim 2 wherein $R_2'$, $R_4$, and $R_5$ are hydrogen, $R_3$ is methyl, and $R_6$ is p-methoxy, or the hydrochloric acid addition salt thereof.

7. A 2-aminoimidazole as defined in claim 2 wherein $R_3$, $R_4$, $R_5$, and $R_6$ are hydrogen and $R_2'$ is acetyl.

8. A 2-aminoimidazole as defined in claim 3 wherein $R_1'$, $R_3$, $R_4$, and $R_5$ are hydrogen, $n$ is 0 and $R_6$ is p-fluoro.

9. A 2-aminoimidazole as defined in claim 2 wherein $R_2'$, $R_4$, $R_5$, and $R_6$ are hydrogen and $R_3$ is methyl, or the hydrochloric acid addition salt thereof.

10. A 2-aminoimidazole as defined in claim 2 wherein $R_2'$, $R_3$, $R_4$, and $R_5$ are hydrogen and $R_6$ is p-fluoro, or the hydrochloric acid addition salt thereof.

11. A 2-aminoimidazole as defined in claim 2 wherein $R_2'$, $R_3$, $R_4$, and $R_5$ are hydrogen and $R_6$ is o-chloro.

12. A 2-aminoimidazole as defined in claim 3 wherein $R_1'$, $R_3$, $R_4$, and $R_5$ are hydrogen, $R_6$ is o-chloro, and $n$ is 1.

13. A 2-aminoimidazole as defined in claim 3 wherein $R_1'$, $R_3$, and $R_4$ are hydrogen, $n$ is 0, and $R_5$ and $R_6$ are chloro in 2- and 6-positions, or the hydrochloric acid addition salt thereof.

14. A 2-aminoimidazole as defined in claim 2 wherein $R_3$, $R_4$, $R_5$, and $R_6$ are hydrogen and $R_2'$ is ethyl or the hydrochloric acid addition salt thereof.

15. A 2-aminoimidazole as defined in claim 3 wherein $R_1'$, $R_3$, $R_4$, and $R_5$ are hydrogen, $n$ is 0, and $R_6$ is o-chloro.

16. A compound as defined in claim 1 wherein $R_1$ is carbethoxyethyl, $R_2$ is 2,6-dichlorophenyl, $R_3$ and $R_4$ are hydrogen, and $n$ is 0.

17. 1-phenyl-2-diacetylamino imidazole.

(References on following page)

References Cited

UNITED STATES PATENTS 2,988,478  6/1961  Gordon _____ 167—55

OTHER REFERENCES

Burmistrov et al.: Chem. Abst., vol. 62, col. 14657 (June 7, 1965). QD1. A51.

Hofmann: Imidazole and Its Derivatives, part I, pp. 347–8, N.Y. Interscience, 1953. QD401.H6.

Lawson: Jour. Chem. Soc. (London), 1956, pp. 307–10. QD1.C6.

HENRY R. JILES, Primary Examiner

N. TROUSOF, Assistant Examiner

U.S. Cl. X.R.

260—326, 340, 551, 552, 564, 565, 584; 424—273